US005305178A

United States Patent [19]

Binder et al.

[11] Patent Number: 5,305,178

[45] Date of Patent: Apr. 19, 1994

[54] CAPACITOR WITH INCREASED ELECTRICAL BREAKDOWN STRENGTH AND METHOD OF FORMING THE SAME

[75] Inventors: Michael Binder, Brooklyn, N.Y.; Robert J. Mammone, South Plainfield; Bernard Lavene, Ocean, both of N.J.

[73] Assignee: The United States of America as represented by the Secretary of the Army, Washington, D.C.

[21] Appl. No.: 931,618

[22] Filed: Aug. 18, 1992

Related U.S. Application Data

[63] Continuation-in-part of Ser. No. 743,660, Aug. 12, 1991, abandoned, and Ser. No. 829,194, Feb. 3, 1992, abandoned.

[51] Int. Cl.[5] .......................... H01G 4/08; H01G 7/00

[52] U.S. Cl. .................................... 361/323; 29/25.42

[58] Field of Search ........................ 361/323, 326, 321; 29/25.42; 427/13, 79, 490, 569; 324/689; 313/231.31; 156/643, 646; 219/121.43, 121.41; 264/22

[56] References Cited

U.S. PATENT DOCUMENTS

| | | | |
|---|---|---|---|
| 4,054,680 | 10/1977 | Shanbaugh et al. | 427/13 |
| 4,327,395 | 4/1982 | Yagitani et al. | 361/326 |
| 4,393,092 | 7/1983 | Gill | 427/38 |
| 4,645,551 | 2/1987 | Adams et al. | 156/82 |
| 4,711,808 | 12/1987 | Marcus et al. | 428/336 |
| 4,882,653 | 11/1989 | Suzuki | 361/323 |
| 4,935,661 | 6/1990 | Heinecke et al. | 313/231.31 |
| 5,147,726 | 9/1992 | Suzuki | 428/458 |
| 5,151,660 | 9/1992 | Powers et al. | 324/689 |

*Primary Examiner*—Bruce A. Reynolds
*Assistant Examiner*—Michael D. Switzer
*Attorney, Agent, or Firm*—Michael Zelenka; William H. Anderson

[57] ABSTRACT

The electrical breakdown strength of capacitors is increased by briefly exposing the dielectric, the metal foil, and/or the fully assembled capacitor to a low pressure, low temperature gas plasma.

33 Claims, 2 Drawing Sheets

D.C. BREAKDOWN VOLTAGE FOR POLYPROPYLENE FILM (12μ) 90% CONFIDENCE LIMITS BASED ON WEIBULL DISTRIBUTION

CAPACITOR WITH INCREASED ELECTRICAL BREAKDOWN STRENGTH AND METHOD OF FORMING THE SAME

GOVERNMENT INTEREST

The invention described herein may be manufactured, used, and licensed by or for the Government of the United States of America for governmental purposes without the payment to us of any royalty thereon.

This application is a continuation in part of U.S. patent application, Ser .No. 07/743,660 filed Aug. 12, 1991, by Michael Binder and Robert J. Mammone for "METHOD OF INCREASING THE ELECTRICAL BREAKDOWN VOLTAGE OF A THIN POLYMER FILM", and now abandoned and of U.S. patent application, Ser. No. 07/829,194, filed Feb. 3, 1992, by Michael Binder, Robert Mammone and Bernard Lavene for "POLYMER BASED FILM CAPACITOR WITH INCREASED DIELECTRIC BREAKDOWN STRENGTHS", and now abandoned both assigned to a common assignee.

FIELD OF INVENTION

This invention relates to capacitors, and in particular to capacitors with greatly increased overall electrical breakdown strengths which enable the capacitor to be operated at higher voltages. Higher operating voltages mean that more electrostatic energy can be stored in these capacitors.

BACKGROUND OF THE INVENTION

The maximum electrostatic energy density that can be stored in polymer based film capacitors depends on the product of the total capacitance of the capacitor and the square of the maximum voltage that can be safely applied across the capacitor (its breakdown voltage). The higher the operational voltage of a capacitor, the greater the attainable energy storage capability because attainable energy densities of film capacitors increase as the square of the voltage applied across the capacitor. If overall breakdown strengths of films can be increased, then capacitors can be operated at higher voltages thereby increasing the electrostatic energy densities of the capacitors.

Polymers with high resistivity, high permittivity, low dissipation factors and high electric field breakdown strengths (Vb) have important applications as dielectrics in film capacitors. Since the capacitor industry is cost and performance driven, constantly increasing demands are made on materials to lower cost, and improve their reliability and performance. Polymer film capacitors have long been of interest because manufacturing technologies associated with extrusion or solution casting of polymer films can be readily combined with thin film metallization techniques to yield devices that are flexible, economical and that can be constructed into very large capacitors. Polymer films such as polycarbonate, polypropylene and polyester have been the insulating media of choice for fabrication of thin film electrostatic capacitors for operation in the kilovolt range.

One such capacitor which is widely known in this art is the wound capacitor. Wound capacitors are constructed by sandwiching a dielectric film such as polycarbonate, polypropylene or polyester film between metal foil sheets and then winding this material around a mandrel to form the capacitor. Generally, the width of the metal foil is less than that of the dielectric polymer strip, so that a margin is created around each of the sides, thereby acting as an apron to prevent flashovers. Specific examples of wound capacitors are found in the following U.S. patents: U.S. Pat. No. 4,320,437, entitled, "Capacitor with Edge Coated Electrode," and issued to Shaw et al on Mar. 16, 1982; U.S. Pat. No. 4,719,539, entitled, "Hermetically Sealed Capacitor," and issued to Lavene on Jan. 12, 1988; and U.S. Pat. No. 4,685,026, entitled, "Capacitor Forming and Manufacturing Method," and issued to Lavene on Aug. 4, 1987. Other capacitors, such as disk capacitors, are also well known to those skilled in the art.

SUMMARY OF THE INVENTION

In accordance with the present invention, capacitors or capacitor components are exposed to a low pressure, low temperature gas plasma. This exposure of fully assembled capacitors or capacitor components to gas plasmas produces an increase in the electrical breakdown strength of the capacitor.

BRIEF DESCRIPTION OF THE DRAWINGS

These features and details of this invention will be better understood in light of the following description and drawings in which.

BEST MODES FOR CARRYING OUT THE INVENTION

Figure 1:
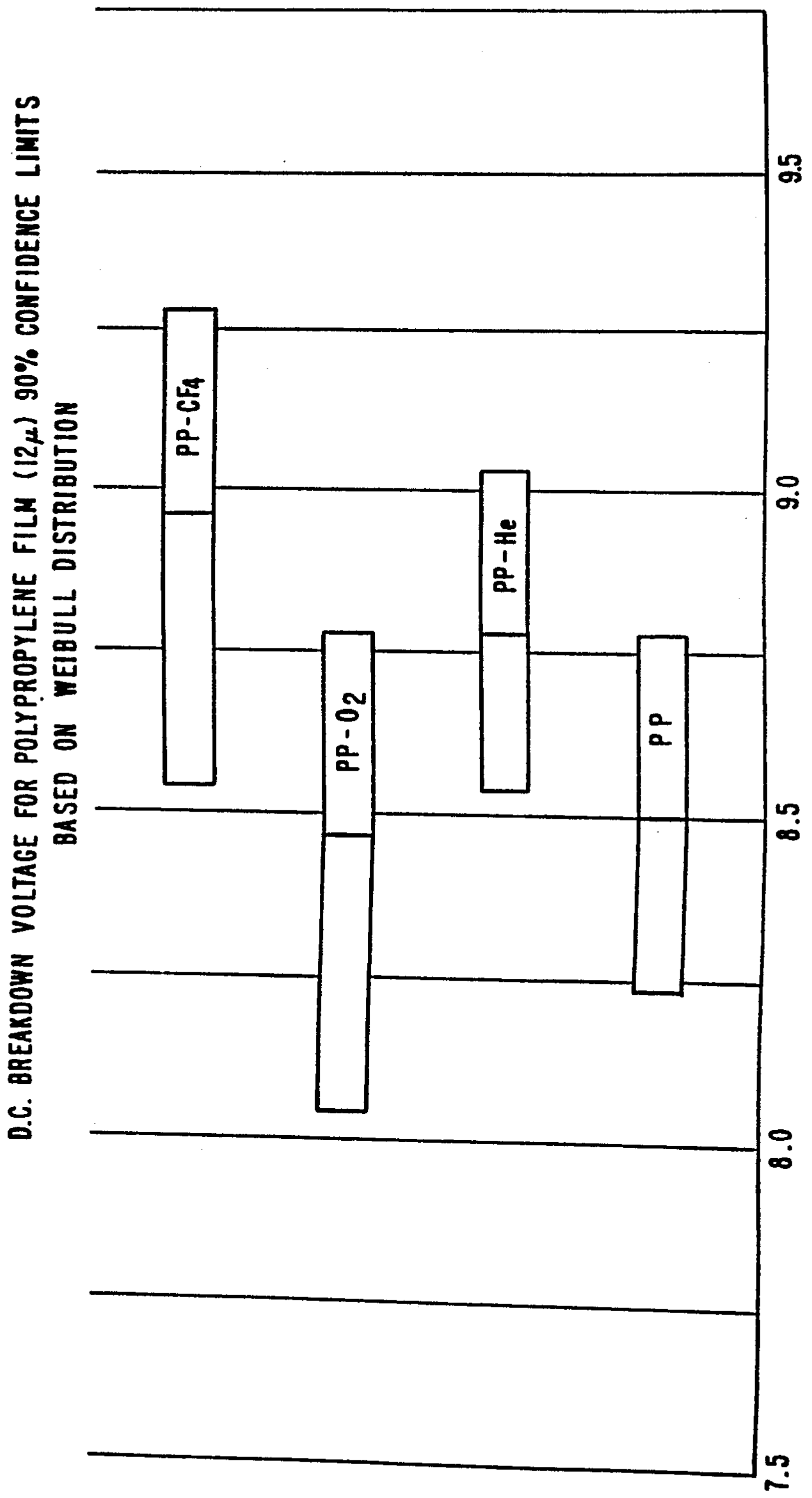
FIG. 1 shows the DC breakdown voltages for polystyrene films of about 12 microns in thickness that are unexposed or have been exposed to low pressure, low temperature gas plasmas of helium, oxygen, and 96%$CF_4$/4%$O_2$ with a 90 percent confidence limit based on Weibull distribution.

In the most generic embodiment of the invention, any portion or all of a capacitor is exposed to a gas plasma. The treatment of such a capacitor increases the maximum applied voltage that can be sustained by the fully assembled capacitor. This treatment includes, but is not limited to, exposure of the dielectric or the material which forms the dielectric; the metal foil; exposure of the fully assembled capacitor; or exposure of any combination thereof to a gas plasma. Generally, the exposure times are brief, for example, four minutes or less and the pressure in the exposure chamber is low, for example, 300 to 500 millitorr. Although any type of gas plasma may be used for purposes of this invention, in an exemplary embodiment of the present invention, $CF_4/O_2$ is used. Some other types of gas plasmas which may be used are $O_2$, He, $N_2$, $NH_3$, $CO_2$, and water vapor.

The following describes exemplary procedures utilized in fabricating wound capacitors and test results for each of the described procedures. These descriptions are merely being used as examples of the processes embodied by the invention and are not to be viewed as a limitation to the claimed invention because, as those skilled in the art would readily recognize, other types of capacitors, such as disk capacitors, will benefit from the present invention.

TREATMENT OF POLYMER RESINS

Pellets of polypropylene (PP) resin (PD-064K), were milled in a Thomas-Wiley mill and exposed to 96% $CF_4$/4% $O_2$ gas plasma by evenly distributing a thin layer of ground-up resin on aluminum foil in a Branson/IPC (Fort Washington, Pa.) Model 4150 barrel plasma etcher at power levels of approximately 0.006 W/cm3 for 4 minutes. The treated and untreated polypropylene (PP) resins were then sieved and portions of powder captured by 30 or 40 mesh screens were extruded on a screw type, Randcastle Microextruder under the following conditions: screw RPM: 50; die temperature: 450° F.; barrel zone temperatures were 350° F. for zone 1, 400° F. for zone 2 and 450° F. for zone 3. Thereafter, translucent PP films, approximately 25 microns thick and 40 mm wide, were made from both untreated PP resin and PP resin that had been exposed to 96% $CF_4$/4% $O_2$ plasma.

Breakdown voltages of the PP films were measured in air at room temperature by ramping the voltage from zero volts at 500 volts per second until breakdown occurred and the film could not hold off any additional voltage.

TABLE 1

Comparison of dielectric properties (dielectric constant, dielectric loss and breakdown voltage) for PP films (14 microns thick) which were melt extruded from 30 mesh PP resin and which had been briefly exposed to $CF_4/O_2$ gas plasma.

| | Baseline | Exposed to $CF_4/O_2$ |
|---|---|---|
| Dielectric constant | | |
| @ 1000 Hz | 2.15 | 2.2 |
| @ 10,000 Hz | 2.15 | 2.2 |
| Dielectric loss | | |
| @ 1000 Hz | 7.4 × 10 − 4 | 5.40 × 10 − 4 |
| @10,000 Hz | 6.2 × 10 − 4 | 6.00 × 10 − 4 |
| Breakdown Voltage | | |
| KV/mil | 15.2 | 19.2 |

Table 1 lists dielectric properties of two kinds of PP film, PP film extruded from unexposed PP resin and PP film extruded from PP resin that had been briefly exposed to $CF_4/O_2$ plasma. The data clearly shows that exposure of PP resin to $CF_4/O_2$ plasma prior to melt extrusion increased the subsequent breakdown voltages of formed films by about 25% without significantly affecting either the dielectric constant or dielectric loss.

Although the exemplary embodiment shows the use of PP powder as the starting resin material, one might use other thermoplastic resins as starting materials for the melt extrusion method of this invention.

It is plausible that this increase in dielectric breakdown strengths may be due to removal of surface contaminants, inhibitors or antioxidants which would normally be adsorbed on finely powdered resin surfaces. These species become trapped within the bulk of the film during melt extrusion, thereby lowering the effective breakdown strength of the formed films. Removal of these species from the resin surface by action of the gas plasma yields purer resin, which, when melt extruded, produces films having higher breakdown strengths.

Moreover, it is plausible that thin, cross-linked or chemically modified (i.e. fluorinated or oxidized) surface layers may be formed on the surfaces of powdered resin by action of the gas plasma. These reactions may be caused by direct exposure to, and/or reaction with, the gas plasma, and/or by surface activation by the action of the gas plasma which is followed by subsequent exposure of the activated surface to the ambient atmosphere (i.e. oxygen or moisture). These chemically modified resin surfaces, when melted, are then blended into the bulk of the polymer film during melt extrusion and this chemically modified material may act to either increase the bulk resistance of the films or to limit the ability of charge to be injected into the polymer film.

TREATMENT OF NONCONDUCTIVE POLYMER FILMS

Figure 2:
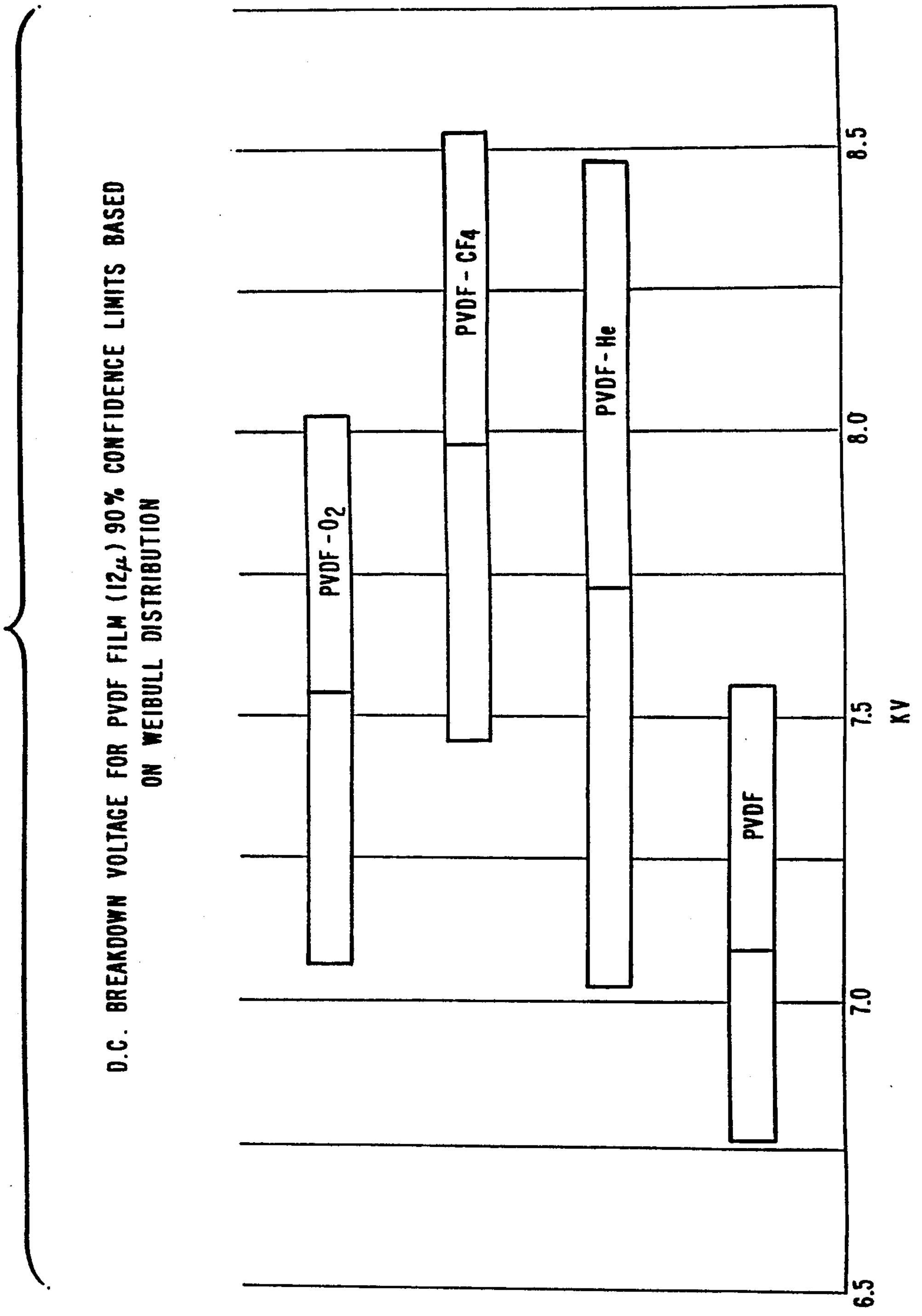
FIG. 2 shows the DC breakdown voltages for polyvinylidene fluoride films of about 12 microns in thickness that are unexposed or have been briefly exposed to low pressure, low temperature gas plasmas of helium, oxygen, or 96%$CF_4$/4%$O_2$ with a 90 percent confidence limit based on Weibull distribution.

Commercially available (12 micron thick) polypropylene or polyvinylidene fluoride films were cut from a large roll and briefly exposed to a low pressure, low temperature gas plasma. The gas plasmas utilized included oxygen, helium, and/or a mixture of 96% $CF_4$ and 4% $O_2$; however, as stated earlier other gas plasmas may be utilized. Following the plasma treatment, the breakdown strength of these samples were measured by applying a 500 volt/second voltage ramp across the film with ¼ inch electrodes. Seven or more individual breakdown events were averaged. The 90% confidence limits for these samples are listed in FIGS. 1 and 2.

In the case of $CF_4/O_2$ plasma treatments, carbon/-fluorine bonds are formed on the surface. Since it is more difficult for charge to be injected through this highly insulating layer into the bulk, the overall breakdown strength was increased dramatically. The effect was most pronounced in the case of $CF_4/O_2$ plasma treatment on polyvinylidene fluoride. In the case of polyvinylidene fluoride, the $CF_2CH_2$ structure was modified to either a $CF_2CFH$ or a $CF_2CF_2$, or any CFxHy (where $x+y=3$) type material.

TREATMENT OF METAL FOILS

Wound polycarbonate capacitors were assembled with 20 gauge thick 80% tin/20% lead foil (0.020 mils thick), an 0.060 arbor and a 0.500×40 polycarbonate inner core. Two basic capacitor designs were used. One design used 4×0.500×20 polycarbonate film while the other design used 2×0.500×40 polycarbonate film. (In this designation, the first number (either 2 or 4) corresponds to how many layers of film per winding and the last number (either 20 or 40) corresponds to the gauge thickness.) For each capacitor type, the tin/lead foil was either baseline tin/lead foil or tin/lead foil taken from a tightly wound roll that had been briefly exposed to $CF_4/O_2$ gas plasma. Since elimination of the possibility of breakdown at the margins of the capacitors was desired, these capacitors were tested in a silicone oil environment rather than in air. Therefore, after these four capacitor types were wound, they were impregnated with silicone oil and hermetically sealed in silicone oil filled metal cans so that possible edge effects (air breakdown at the margins) were eliminated.

TABLE 2

Capacitance and dissipation factors of these fully assembled capacitors (both at 1 KHz) and breakdown voltages are listed below.

| CAPACITOR TYPE | CAPACITANCE @ 1 KHz | DF | BREAKDOWN VOLTAGE Volts |
|---|---|---|---|
| 4 × .500 × 20 POLYCARBONATE | | | |
| Untreated tin foil | 0.0282 | 0.104 | 917 |
| Treated tin foil | 0.0277 | 0.103 | 4928 |
| Percentage Change | −2% | −1% | +537% |
| 2 × .500 × 40 | | | |

TABLE 2-continued

Capacitance and dissipation factors of these fully assembled capacitors (both at 1 KHz) and breakdown voltages are listed below.

| CAPACITOR TYPE | CAPACITANCE @ 1 KHz | DF | BREAKDOWN VOLTAGE Volts |
|---|---|---|---|
| POLYCARBONATE | | | |
| Untreated tin foil | 0.0293 | 0.101 | 1407 |
| Treated tin foil | 0.0289 | 0.105 | 3095 |
| Percentage Change | −1% | +4% | +220% |

As expected for these fully wound, assembled capacitors, use of tin/lead foil that had been exposed to a $CF_4/O_2$ gas plasma did not significantly change either the overall capacitance or dissipation factor. This is expected since these two terms depend primarily on the polymer dielectric used in the capacitor. However, Vb, showed a dramatic increase.

As shown, capacitors constructed with two-ply polycarbonate films and tin/lead foil that had been exposed to $CF_4/O_2$ plasma showed a 220% increase in overall Vb over similar capacitors made with unexposed tin/-lead foils. Capacitors constructed with four-ply polycarbonate films and tin/lead foil that had been exposed to $CF_4/O_2$ plasma showed a 537% increase in Vb over similar capacitors fabricated with unexposed tin/lead foil.

As may be readily appreciated by those skilled in the art, other metal foils such as aluminum and copper may also be treated as described above.

Postmortem analysis of these capacitors after failure showed that most pinholes, which are the locations where dielectric breakdown of the polymer film had taken place, were located in edge regions where the polymer film had been pressing against the edge of the tin/lead foil. In this region, the effective electric field intensity is very high. This is because the effective electric field intensity is calculated by dividing the value of the applied electric field by the area of the electrodes. At metal foil edges, the area of the metal electrode is very small and the effective electric field intensity is enhanced dramatically. In addition, the metal foil pressing against the polymer film at the foil edges tend to mechanically deform the polymer film at the foil edges and tend to weaken the film. Both the higher effective electric fields and mechanical deformation of the polymer film make it easier for voltage breakdown to occur. However, in the case of plasma treated metal foil, a thin layer of metal fluoride or metal oxide is formed on the edges of the metal foil. This nonconducting coating is believed to diminish the high effective fields which would normally be present at the edges of untreated metal films and thereby increase the operating voltages of the capacitors. The thin film may also act as a buffer between the metal foil and the film thus diminishing the likelihood of mechanical deformation of the polymer film.

TREATMENT OF FULLY ASSEMBLED CAPACITORS

Loosely wound capacitors in a spiral configuration were constructed by sandwiching thin films of either polycarbonate, polypropylene or polyester between 5 micron thick tin foil and winding this around a mandrel. Polycarbonate based capacitors were constructed with 5 micron thick polycarbonate film; polyester based capacitors were constructed with 3.5 micron thick polyester film and polypropylene based capacitors were constructed with 4 micron thick polypropylene film. A total of 36 capacitors of each type were constructed and divided into three sets. One set of 12 capacitors was used as the control group, the other two sets were exposed to either $O_2$ or 96% $CF_4$/4% $O_2$ gas plasma in a Branson IPC Model 7104 plasma etcher. Exposure times in the gas plasmas were four minutes. Power levels of the gas plasmas were approximately 0.002 watts/cm3. All of these capacitors were then flattened and subjected to a 16 hours bake-out at 54° C. Breakdown voltage measurements were performed in air at room temperature.

The overall capacitance at 1 kHz of loosely wound polyester or polycarbonate capacitors is listed in Table 3.

TABLE 3

Breakdown voltages, in volts, dielectric breakdown strengths in volts/mil based on polymer film thickness, and total capacitance at 1 kHz, of fully constructed, loosely wound polycarbonate, polyester and polypropylene based film capacitors before and after they had been briefly exposed to either an oxygen of $CF_4/O_2$ gas plasma. Low and high refer to the lowest and highest breakdown voltages measured within a given set.

| CAPACITOR TYPE | BREAKDOWN VOLTAGE VOLTS LOW | HIGH | AVERAGE | Dielectric Strength v/mil | Capac. @ 1 kHz., mFarads |
|---|---|---|---|---|---|
| POLYCARBONATE | | | | | |
| unexposed | 96 | 378 | 276 | 1380 | 0.179 |
| exposed to $O_2$ | 211 | 406 | 310 | 1550 | 0.183 |
| exposed to $CF_4/O_2$ | 343 | 869 | 555 | 2775 | 0.182 |
| POLYESTER | | | | | |
| unexposed | 380 | 1280 | 879 | 6279 | 0.341 |
| exposed to $O_2$ | 310 | 1280 | 880 | 6286 | 0.344 |
| exposed to $CF_4O_2$ | 770 | 1290 | 1083 | 7736 | 0.342 |
| POLYPROPYLENE | | | | | |
| Unexposed | 590 | 1060 | 809 | 5056 | 0.205 |
| exposed to $O_2$ | 640 | 860 | 741 | 4631 | 0.182 |
| exposed to $CF_4/O_2$ | 410 | 1110 | 841 | 5256 | 0.185 |

Capacitances did not change noticeably after exposure to either oxygen or $CF_4/O_2$ plasma. Polypropylene capacitors showed an approximately 10% decrease in capacitance after exposure to either oxygen or $CF_4/O_2$ plasma.

Breakdown voltages of loosely wound polycarbonate, polyester and polypropylene bases capacitors are also listed in Table 3. Exposure of these capacitors to 96% $CF_4$/4% $O_2$ plasma produced more dramatic increases in breakdown voltages than did exposure to $O_2$ gas plasma. For polycarbonate based capacitors, exposure to 96% $CF_4$/4% $O_2$ gas plasma for just four minutes doubled the breakdown voltages as compared with baseline capacitors. Polyester based capacitors showed a more modest 23% increase in breakdown voltages after exposure for four minutes to 96% $CF_4$/4% $O_2$ gas plasma while polypropylene based capacitors showed only a 4% improvement in breakdown voltage following exposure to $CF_4/O_2$ plasma.

Treating capacitors with a gas plasma may form a chemically modified layer not only on the edges of the metal foil, but also forms a chemically modified layer on the polymer dielectric itself. Both of these changes result in the decreased charge injection capabilities of either the foil or film.

INDUSTRIAL APPLICABILITY

The present invention as enumerated in the various embodiments set forth above would most generally be used as a capacitor where large amounts of electrical current need to be stored reserved and/or delivered. Such applications would include power plants, hand-held portable equipment, high efficiency, high energy power supplies, pacemakers, and filtering applications and the like.

Although the present invention has been described above with respect to wound capacitors, it is understood that the invention relates to other types of capacitors. For example, the present invention will also relate to disk capacitors. Therefore, one skilled in the art would readily be able to apply the present invention to other types of capacitors.

Furthermore, it is understood that the dielectric may be comprised of at least one of a variety of materials. Exemplary materials which may be used for dielectric material include polymers, copolymers, and ceramics. Thus, polycarbonate, polypropylene, polyvinylidene fluoride or polyester may also be applied for use in the present invention. Other materials may be readily chosen for use as a dielectric as one skilled in the art may readily recognize.

What is claimed is:

1. A method of producing a capacitor with increased dielectric breakdown strength, comprising the steps of:
   providing a nonconductive dielectric;
   providing a metal film;
   exposing at least one of the nonconductive dielectric and the metal film to a gas plasma; and
   placing the nonconductive dielectric and the metal film together to form the capacitor;

wherein at least one of the nonconductive dielectric and the metal film are exposed to said gas plasma for a time period effective to increase dielectric breakdown strength of said capacitor.

2. A method of producing a capacitor according to claim 1 wherein the gas plasma is selected from the group consisting of $O_2$, He, $N_2$, $NH_3$, $CO_2$, $CF_4/O_2$, or water vapor.

3. A method of producing a capacitor according to claim 1 wherein the gas plasma is a mixture of 96% $CF_4$ and 4% $O_2$.

4. A method of producing a capacitor according to claim 1 wherein at least one of the non-conductive dielectric and the metal foil is exposed to said gas plasma from about 0.5 to about 8 minutes.

5. A method of producing a capacitor according to claim 1 wherein the gas plasma is applied at a pressure of about 300 millitorr to about 500 millitorr and at a temperature from about 10° C. to about 60° C.

6. A method of producing a capacitor according to claim 1 wherein the dielectric is a thermoplastic based film.

7. A method of producing a capacitor according to claim 1 wherein the dielectric is selected from the group consisting of polycarbonate, polypropylene, polyvinylidene fluoride or polyester.

8. A method of producing a capacitor according to claim 1 wherein the dielectric is comprised of at least one of a polymer, a copolymer and a ceramic.

9. A capacitor formed in accordance with the method of claim 1.

10. A method of producing a capacitor with increased dielectric breakdown strength according to claim 1, wherein said metal film is a metal foil.

11. A method of producing a capacitor with increased dielectric breakdown strength, comprising the steps of:
   providing a nonconductive resin;
   providing a metal film;
   exposing at least one of the nonconductive resin and the metal film to a gas plasma;
   forming said resin into a nonconductive dielectric; and
   placing the nonconductive dielectric and the metal film together to form the capacitor;

wherein at least one of the nonconductive dielectric and the metal film are exposed to said gas plasma for a time period effective to increase dielectric breakdown strength of said capacitor.

12. A method of producing a capacitor according to claim 11 wherein the gas plasma is selected from the group consisting of $O_2$, He, $N_2$, $NH_3$, $CO_2$, $CF_4/O_2$, or water vapor.

13. A method of producing a capacitor according to claim 11 wherein the gas plasma is a mixture of 96% $CF_4$ and 4%.

14. A method of producing a capacitor according to claim 11 wherein at least one of the non-conductive dielectric and the metal foil is exposed to said gas plasma from about 0.5 to about 8 minutes.

15. A method of producing a capacitor according to claim 11 wherein the gas plasma is applied at a pressure of about 300 millitorr to about 500 millitorr and at a temperature from about 10° C. to about 60° C.

16. A method of producing a capacitor according to claim 11 wherein the resin is a thermoplastic resin.

17. A method of producing a capacitor according to claim 11 wherein the resin is selected from the group consisting of polycarbonate, polypropylene, polyvinylidene fluoride or polyester.

18. A method of producing a capacitor according to claim 11 wherein the resin is comprised of at least one of a polymer, a copolymer and a ceramic.

19. A capacitor formed in accordance with the method of claim 10.

20. A method of producing a capacitor with increased dielectric breakdown strength according to claim 11, wherein said metal film is a metal foil.

21. A method of producing a capacitor with increased dielectric breakdown strength, comprising the steps of:
   providing said capacitor with a nonconductive dielectric;
   providing a gas plasma external to said capacitor with said nonconductive dielectric;
   exposing at least a portion of said capacitor with said nonconductive dielectric to said gas plasma for a time period effective to increase dielectric breakdown strength of said capacitor.

22. A method of producing a capacitor according to claim 21 wherein the gas plasma is selected from the group consisting of $O_2$, He, $N_2$, $NH_3$, $CO_2$, $CF_4/O_2$, or water vapor.

23. A method of producing a capacitor according to claim 21 wherein the gas plasma is a mixture of 96% $CF_4$ and 4% $O_2$.

24. A method of producing a capacitor according to claim 21, wherein at least said portion of said capacitor is exposed to said gas plasma from about 0.5 to about 8 minutes.

25. A method of producing a capacitor according to claim 21 wherein the gas plasma is applied at a pressure of about 300 millitorr to about 500 millitorr and at a temperature from about 10° C. to about 60° C.

26. A method of producing a capacitor according to claim 21 wherein said capacitor includes a thermoplastic based film.

27. A method of producing a capacitor according to claim 21 wherein said capacitor includes a dielectric which is selected from the group consisting of polycarbonate, polypropylene, polyvinylidene fluoride or polyester.

28. A method of producing a capacitor according to claim 21 wherein said capacitor includes a dielectric which is comprised of at least one of a polymer, a copolymer and a ceramic.

29. A capacitor formed in accordance with the method of claim 21.

30. A method of producing a capacitor with increased dielectric breakdown strength, comprising the steps of:

providing a nonconductive dielectric;

providing a metal film;

exposing the nonconductive dielectric to a gas plasma; and placing the nonconductive dielectric and the metal film together to form the capacitor;

wherein the nonconductive dielectric is exposed to said gas plasma for a time period effective to increase dielectric breakdown strength of said capacitor.

31. A method of producing a capacitor with increased dielectric breakdown strength, comprising the steps of:

providing a nonconductive resin;

providing a metal film;

exposing the nonconductive resin to a gas plasma;

forming said resin into a nonconductive dielectric; and placing the nonconductive dielectric and the metal film together to form the capacitor;

wherein the nonconductive resin is exposed to said gas plasma for a time period effective to increase dielectric breakdown strength of said capacitor.

32. A method of producing a capacitor with increased dielectric breakdown strengh according to claim 30 wherein said metal film is a metal foil.

33. A method of producing a capacitor with increased dielectric breakdown strengh according to claim 31 wherein said metal film is a metal foil.

* * * * *